Aug. 9, 1938. G. F. DALY 2,126,621

TABULATING MACHINE

Filed Dec. 30, 1933 7 Sheets-Sheet 1

INVENTOR
George F. Daly
BY
ATTORNEY

Aug. 9, 1938.  G. F. DALY  2,126,621
TABULATING MACHINE
Filed Dec. 30, 1933  7 Sheets-Sheet 2

INVENTOR
George F. Daly
BY
ATTORNEY

Aug. 9, 1938.   G. F. DALY   2,126,621
TABULATING MACHINE
Filed Dec. 30, 1933   7 Sheets-Sheet 3

INVENTOR
George F. Daly
BY
A.C. Neaby
ATTORNEY

Aug. 9, 1938.   G. F. DALY   2,126,621
TABULATING MACHINE
Filed Dec. 30, 1933   7 Sheets-Sheet 4
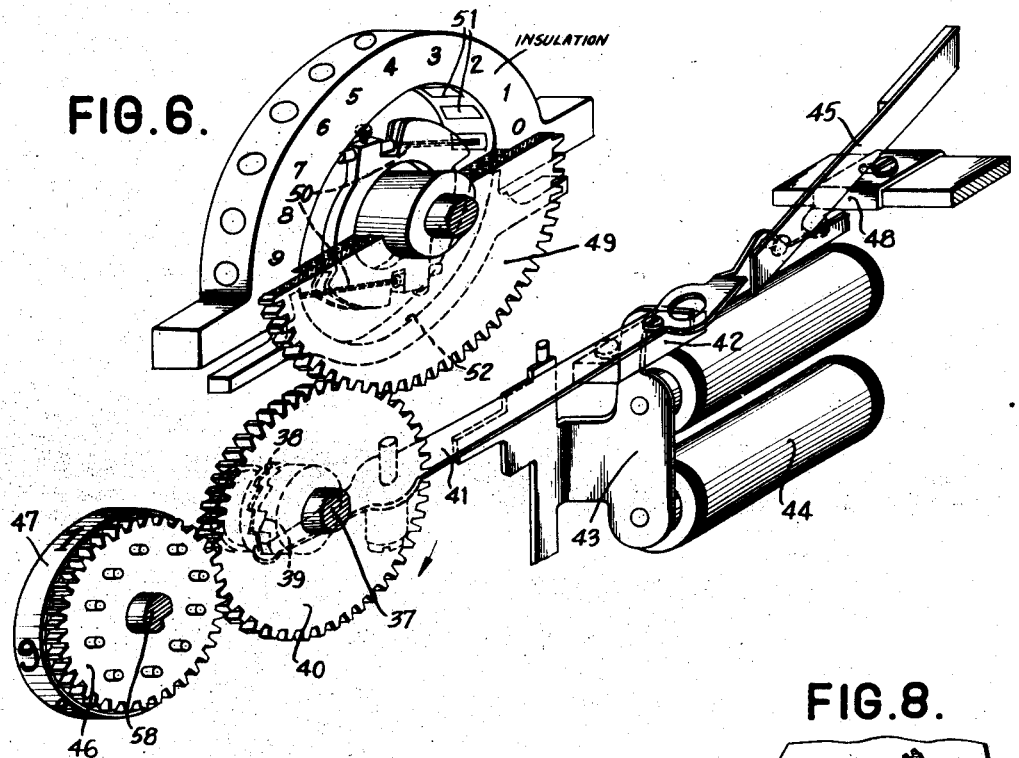
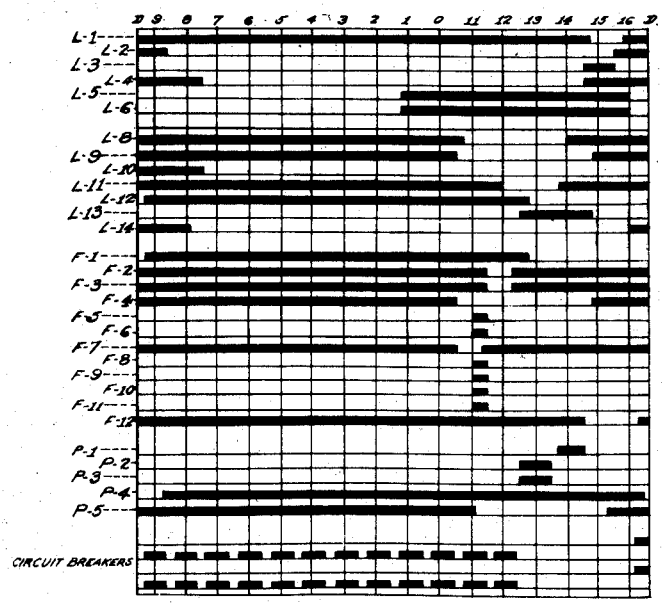
INVENTOR
George F. Daly
BY
ATTORNEY Aug. 9, 1938.   G. F. DALY   2,126,621
TABULATING MACHINE
Filed Dec. 30, 1933   7 Sheets-Sheet 5

INVENTOR
George F. Daly
BY
ATTORNEY

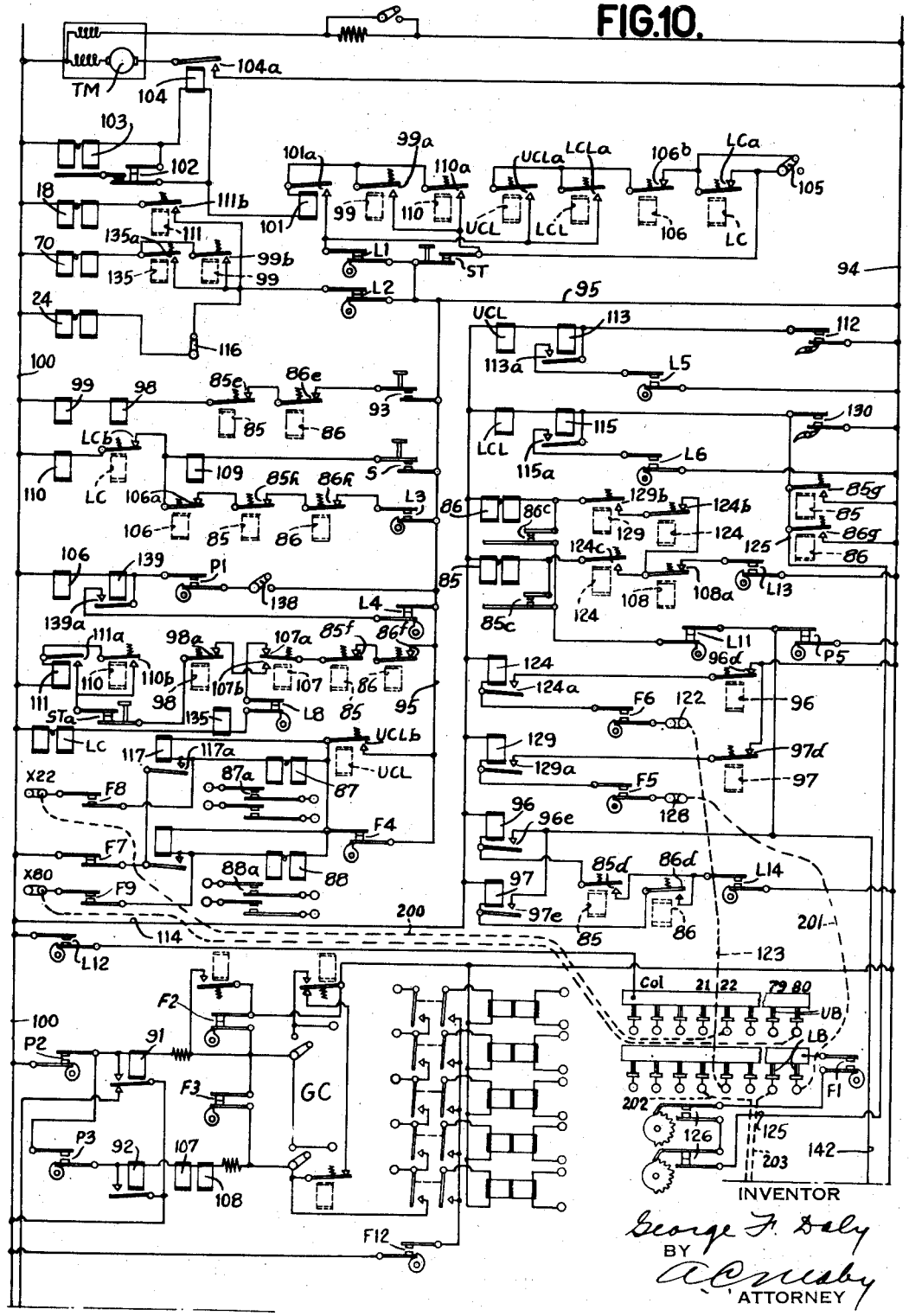

UNITED STATES PATENT OFFICE 2,126,621

TABULATING MACHINE

George F. Daly, Johnson City, N. Y., assignor to International Business Machines Corporation, New York, N. Y., a corporation of New York Application December 30, 1933, Serial No. 704,768

7 Claims. (Cl. 235—61.7)

This invention concerns accounting machines and more particularly accounting machines of the record controlled tabulator type.

The principal object of the invention is to provide a tabulating machine of improved selectivity of operation and of increased utility together with simplification and improvement of the wiring and switching arrangements and improvement of the mechanical structure with a view to imparting additional operating features as well as improvement in and increased utility of the features previously found in such machines.

Another object of the invention is to provide a tabulating machine of the adding and subtracting type in which specific improvements and novel arrangements and construction of parts are introduced with a view to extending the scope of accounting problems which may be performed by the machine.

A more specific object resides in the re-organization of the tabulating machine so that the machine may perform cross addition or cross subtraction of data contained in a plurality of separate fields of a record card. Cross addition is performed by initially entering data from several fields of a record card into separate accumulators and thereafter effecting a succession of transfer cycles of operation during which each of the accumulators in turn may transfer its entry into a common accumulator, resulting in the summation of the data originally entered into all of the accumulators.

A further object of the invention resides in the provision of automatic record controlled means for determining separately for each card or group of cards the number of fields to be cross added or cross subtracted.

A further object resides in the provision of automatically operating devices for causing the machine to perform only as many transfer operations as may be necessary to obtain the selected series of cross summations. The machine, for purposes of illustration, is shown as adapted for use in connection with billing operations as carried out by public utility systems. The individual record cards are each provided with an "amount" field, representing the net amount of the bill, an "arrears" field, and a "tax" field. Each of these fields is generally perforated to represent the appropriate money value and as the card passes through the analyzing devices of the machine, the fields are concurrently sensed and the several values entered into separate accumulators. The amount of the "net bill" field is invariably entered into an "amount" accumulator and the "tax" and "arrears" fields may either or both be entered into their related accumulators or entries may be suppressed from both in response to special designating perforations on the card itself. If both the "tax" and "arrears" fields are entered into their respective accumulators, the machine will subsequently transfer first the tax into the "amount" accumulator and then the arrears into the same "amount" accumulator. If the data from only one of these two fields is entered, then a single transfer cycle is effected to transfer that value into the "amount" accumulator.

In order to allow the subtraction of either the tax or arrears information from the "amount" accumulator selectively, mechanism is provided for causing the values to be transferred to be converted into their complementary values and entered as such.

According to another object of the invention, an accumulation may first be made from a plurality of cards comprising a group and upon completion of the analysis of all the cards of the group, transferring may take place in the same selective manner to transfer the tax and arrears totals into the "amount" accumulator either additively or subtractively.

Heretofore in machines of this type, two separate driving motors have been employed, one for driving the mechanism during adding and listing cycles of operation and the other during total taking operations. This arrangement is not suitable for the performance of certain types of work, where it may be desirable to operate certain of the total taking devices during adding operations. In the present machine, the second motor and the driving connections thereto have been eliminated and the one motor is now employed to drive the mechanism for all types of operation.

With the provision of the single motor drive the cross summation contained in the "amount" accumulator may be printed upon a record strip or bill and at the same time be entered into a fourth accumulator to obtain a grand total of all amounts printed.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 6 is an isometric view of one denominational order of an accumulator.

Fig. 7 is a timing chart of certain of the cam controlled contact devices of the machine.

Fig. 8 is a detail view of the units order of an accumulator showing the mechanism for entering the elusive one during subtracting operations.

Figure 10A:
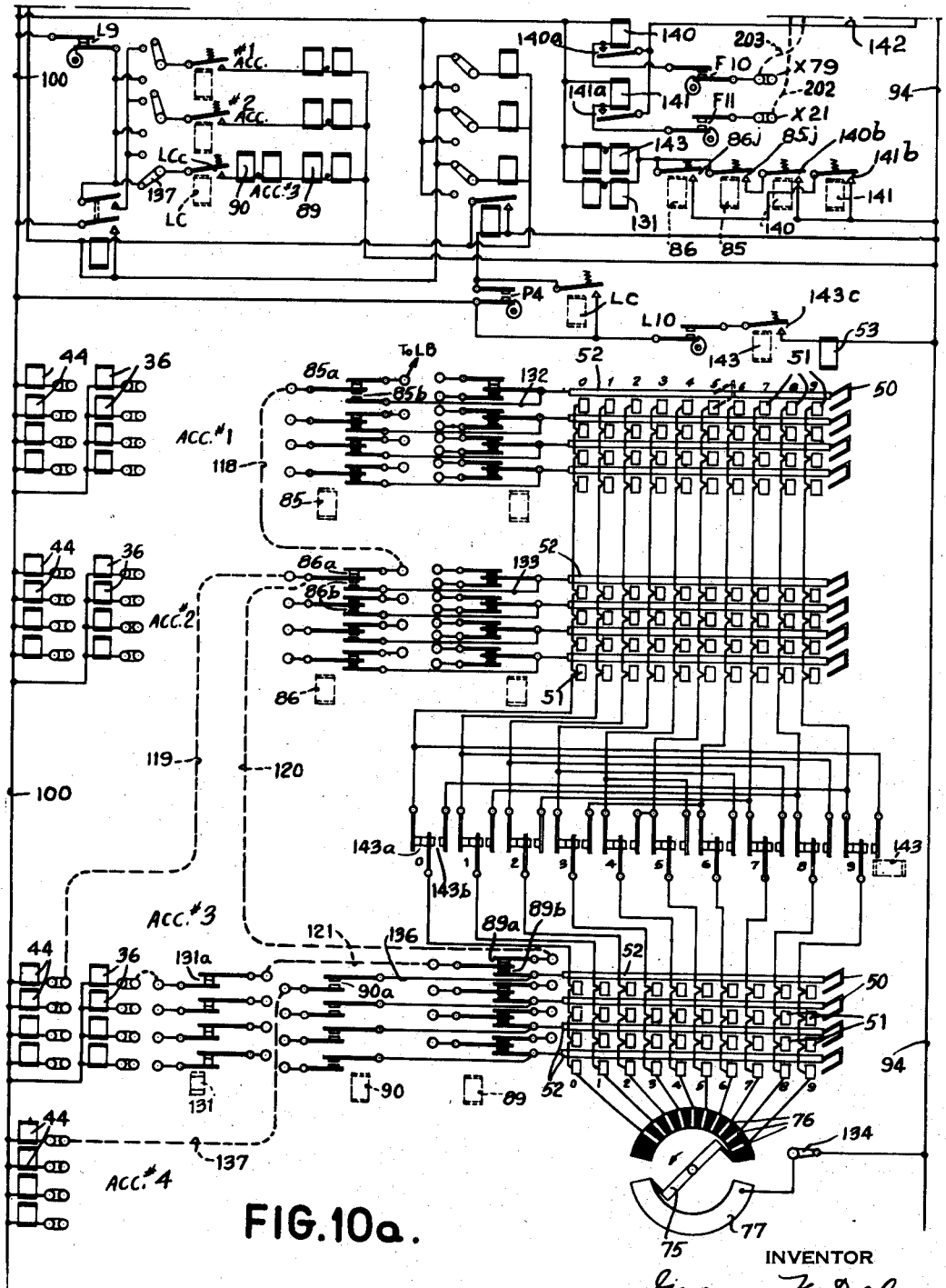

Figs. 10 and 10a taken together comprise a complete wiring diagram of the electric circuits of the machine.

The machine to which the features of the present invention are applied is similar to that shown in the copending application of C. D. Lake and G. F. Daly, Serial No. 672,388, filed May 23, 1933, now Patent No. 1,976,617, issued October 9, 1934. This copending application illustrates and explains in more extensive detail the manner of organization and mode of operation of the various units of a well known type of tabulating machine. In the present machine the reset motor RM of the Lake and Daly machine is omitted and the resetting mechanism is driven from the main driving motor, known as the tabulating motor, to thus constitute a single motor machine. The details of the reset driving mechanism will be set forth hereinafter. Machines of this class may be provided with dynamotors and associated circuits to adapt the machine for operation under different current voltages. In the drawings the dynamotor is not illustrated. In the present application, these mechanisms will be explained in only as much detail as will be necessary to explain the manner in which the objects of the invention may be realized.

Card feeding mechanism

Figure 1:
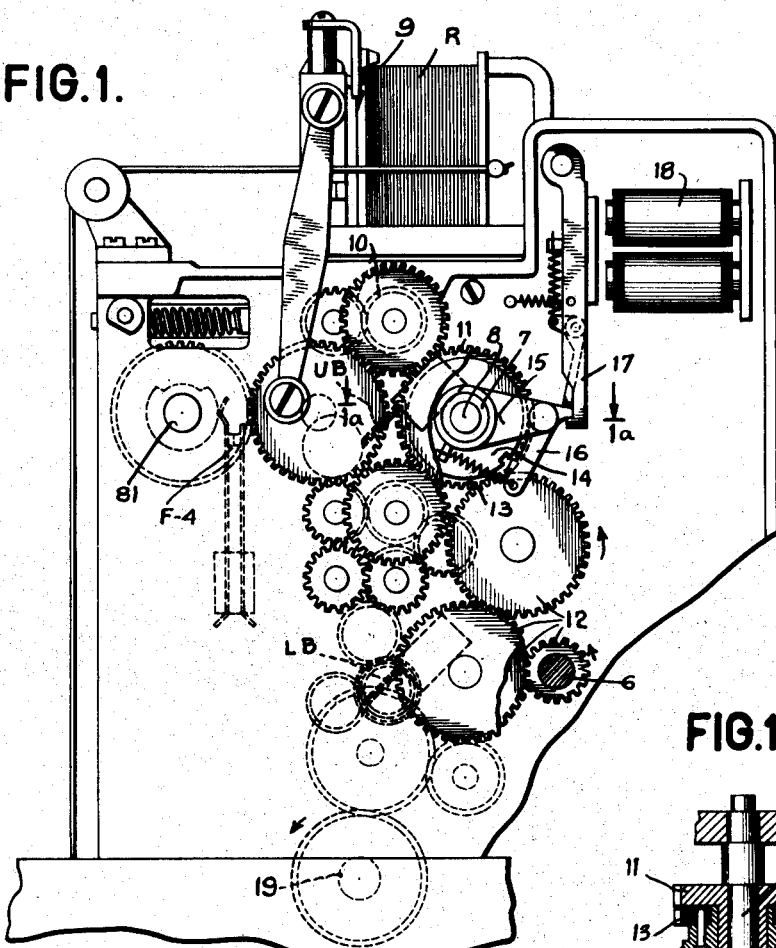
Fig. 1 is an outside view of the card feeding and analyzing mechanism showing the card feed declutching devices.
Figure 1A:
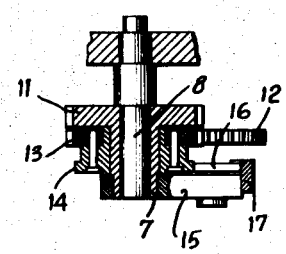
Fig. 1a is a detail section on line 1a—1a of Fig. 1.

The card feeding mechanism shown in Fig. 1 is exactly similar to that shown and described in the application referred to except that provision is made in the form of a clutching device for interrupting the card feeding operations without stopping the accumulating drive mechanism. The analyzing brushes are indicated at UB and LB and the record cards R are successively advanced by picker 9 to pairs of feed rollers 10, which serve to advance the cards past the upper and lower brushes in succession. The shafts upon which rollers 10 are mounted are provided with gears at their extremities and arranged as shown in Fig. 1 for operation by a main driving gear 11 which is freely mounted upon a shaft 8 and which has connection with an arm 15 through a sleeve 7. Arm 15 carries spring-pressed clutching dog 16 normally held in the position shown by an armature latch 17 which is adapted to be controlled by the clutch magnet 18. Between gear 11 and arm 15 are a gear 13 and a clutch driving disk 14 freely rotatable upon the sleeve 7. Gear 13 has gear connection generally designated 12 with the pulley shaft 6 which is in operation as long as the main driving motor is operative. Energization of magnet 18 will trip dog 16 into engagement with disk 14 and the card feeding mechanism will cause cards to be advanced past the brushes UB and LB and feeding operations will continue as long as magnet 18 remains energized. During transferring and total taking cycles of operation, magnet 18 is deenergized and card feeding will, of course, not take place during such cycles.

Printing mechanism

Figure 3:
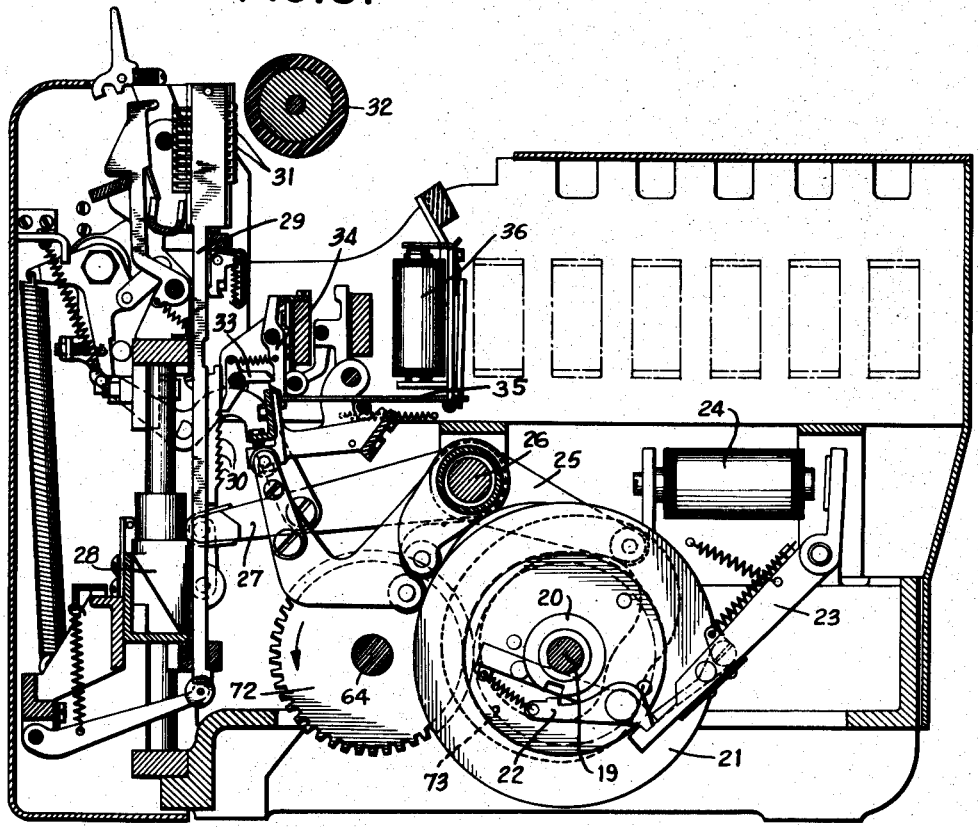
Fig. 3 is a central section of the essential elements of the printing mechanism.
Figure 4:
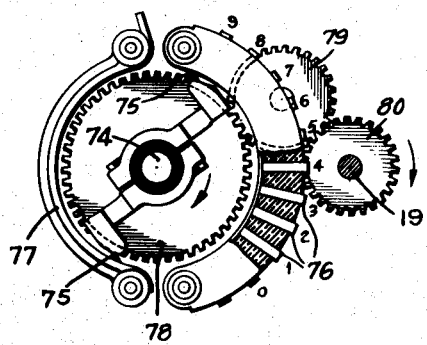
Fig. 4 is a detail of an impulse emitting commutator.
Figure 5:
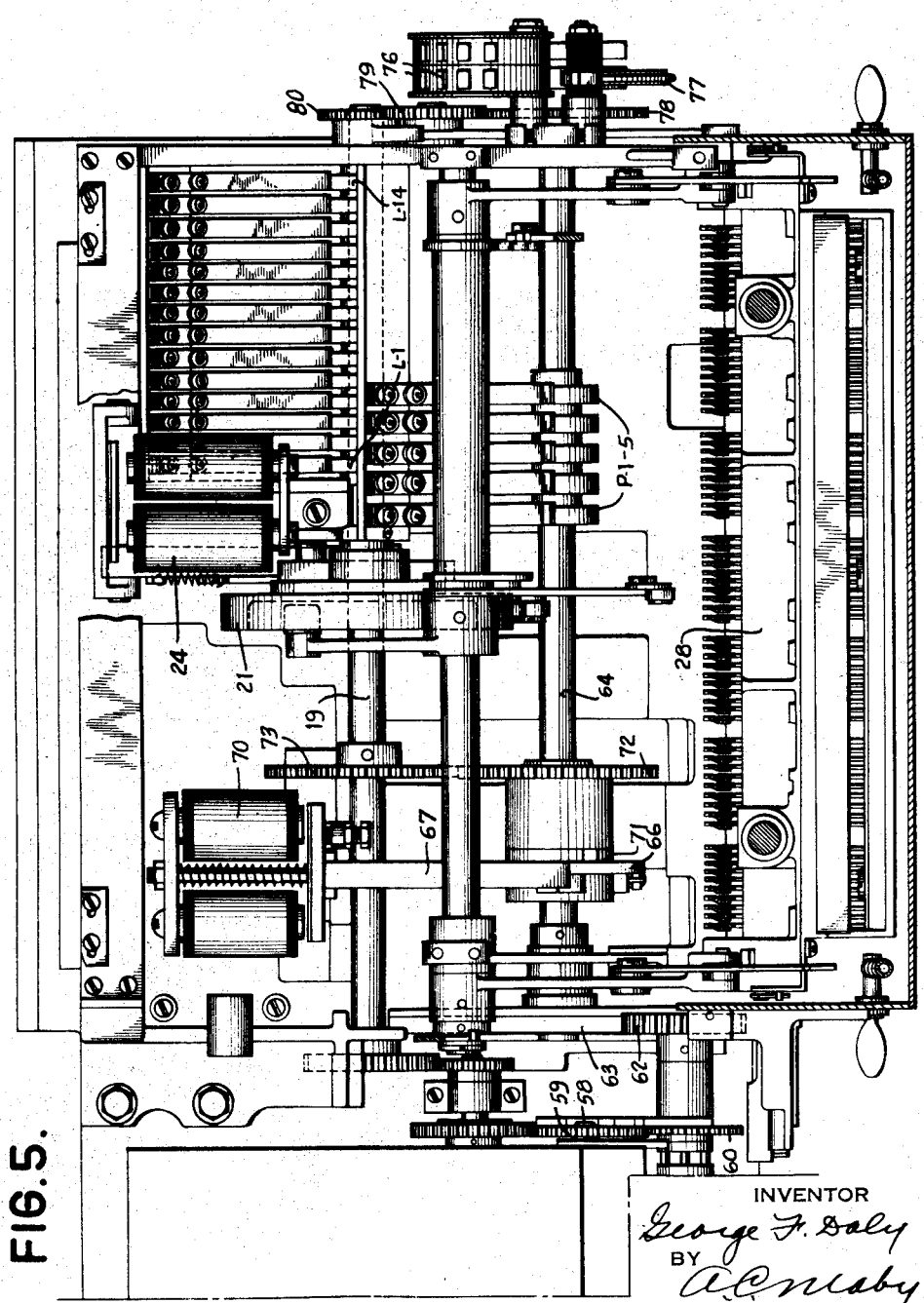
Fig. 5 is a plan sectional view showing the main driving and operating mechanism of the printing section of the machine.

The printing mechanism is shown in Figs. 3 and 5 where the usual so-called listing shaft 19 carries a clutch driving element 20. Shaft 19 has direct driving connection with the constantly running shaft 6 (Fig. 1) so that clutch driving element 20 may rotate continuously. The listing cam 21 is freely carried on the shaft 19 and provided with a spring-pressed clutching dog 22 adapted for engagement with the driving element 20. Dog 22 is normally held out of engagement by arm 23 controlled by magnet 24. Energization of magnet 24 will permit cam 21 to rotate with the listing shaft 19 and follower arm 25 will cause oscillation of rocker shaft 26 to which are secured arms 27 link-connected to the reciprocating crosshead 28 so that for each revolution of cam 21 crosshead 28 will be moved upwardly and then down again to its initial position. Slidingly mounted in the crosshead are type bars 29 spring urged into movement with the crosshead as it rises. As type bar 29 moves upwardly, ratchet teeth 30 successively pass the nose of stopping pawl 33 as the type elements 31 successively pass printing position opposite platen 32. Energization of printing magnet 36 as the type bar moves upwardly will draw call wire 35 toward the right to rock latch 34 out of engagement with stopping pawl 33 whereby the nose of the latter will engage one of the teeth 30 and interrupt further upward movement of the type bar. The upward movement of the type bar is synchronized with the movement of the record card past the analyzing brushes and a perforation sensed by the brushes will energize the magnet 36 to interrupt the type bar with the type element 31 corresponding to the value of the digit represented by the analyzed perforation in printing position. Before the crosshead 28 moves downwardly, the usual printing hammers are tripped to take an impression from the selected type elements.

Cam 21 controls the movement of the crosshead 28 during both listing and total taking operations. Heretofore, in machines of this type, a separate cam and associated linkage were employed to separately operate the printing devices for total taking operations and the cam 21 functioned only during listing operations. The provision of magnet 24 and its associated clutching devices together with the controlling circuits, which will be described in connection with the circuit diagram, permit the use of cam 21 for all printing purposes.

Accumulating mechanism

The adding mechanism is entirely similar to that shown and described in the application referred to and the description thereof will accordingly be limited to a brief explanation of its manner of operation. The drive shaft 37 is directly geared to pulley shaft 6 of Fig. 1 so that it is in operation as long as the driving motor of the machine functions and the driving ratio is such that shaft 37 makes one revolution for each card feeding cycle of the machine. Shaft 37 has slidably mounted thereon, but keyed for rotation therewith, a clutch element 38, one for each denominational order of the accumulator. The element 38 is provided with a groove in which fits the end of the short arm of the lever 41 which is pivoted as shown and provided with a block 42 normally held as in Fig. 6 by armature latch 43 of adding magnet 44. A leaf spring 45 bears against the extremity of the longer arm of lever 41 and moves the same in a counter-clockwise direction upon release of block 42 by armature 43. This movement will bring clutching member 38 into engagement with cooperating teeth 39 integral with a gear 40 loosely mounted on shaft 37. Gear 40, when thus coupled to shaft 37, will rotate a gear 46 which meshes therewith and will displace the accumulator index wheel 47.

The rearward extremity of member 41 is adapted to be engaged by a finger 48 toward the end of the cycle for the purpose of disengaging clutch element 38 from teeth 39 and re-latching block 42 on armature 43.

Briefly summarizing the adding operation, the magnet 44 may be energized at various points in the cycle of the machine, depending upon the location of a perforation in a column of the record card analyzed by the lower brushes LB. This energization may take place in response to a perforation in any of the index point positions from 9 to 1, inclusive. A perforation in the 9 index point position will trip the clutch element 38 nine steps before finger 48 is operated to de-clutch it and a perforation in the 1 index point position will trip the clutch element 38 one step before it is de-clutched by the finger 48. Each step of clutching engagement corresponds to a tenth of a revolution of the accumulator index wheel 47 so that a "9" hole will move it nine-tenths of a revolution and a "1" hole will move it one-tenth of a revolution. The manner in which circuits through the lower brushes control the operation of magnet 44 will be set forth in connection with the explanation of the circuit diagram.

Read-out mechanism

Also driven by gear 40 (Fig. 6) is a gear 49. Since the ratio of gears 49 and 40 is 2:1, the former will turn through a half revolution for each revolution of the latter. Carried by and insulated from gear 49 is a pair of electrically connected brushes 50, one of which cooperates successively with ten conducting segments 51 while the other cooperates with an arcuate conducting strip 52. The relationship of the parts is such that when the index wheel 47 is in its zero position, one of the brushes 50 is in contact with the zero segment 51 and the other brush is in contact with the strip 52, thus forming an electrical connection between the two.

If the wheel 47 is displaced to indicate, say, 8, then one of the brushes 50 will be in contact with the "8" segment 51 and the other brush will be in contact with the arcuate strip 52. The positioning of the brushes 50 provides a convenient electrical read-out mechanism for controlling total transferring and total printing operations and the electrical circuits involved in these functions will be more fully expained in connection with the circuit diagram.

Elusive one

During certain subtracting operations it is necessary to add the so-called fugitive or elusive one into the units order of one of the accumulators. The mechanism by means of which this elusive one is entered into the accumulator is illustrated in Fig. 8 where the units order index wheel 47 has associated therewith a magnet 53 whose armature 54 is secured to the carry lever latch 55 of the units order so that energization of magnet 53 will trip the units pawl carrying arm 56 whereby, during the carrying portion of the machine cycle, the pawl 57 associated with the units order will advance the units index wheel 47 one step.

Accumulator resetting mechanism

The shaft 58 (Fig. 6) upon which the index wheels 47 of an accumulator are loosely mounted is slotted for cooperation with spring-pressed pawls (not shown) pivoted upon and carried by the individual index wheels in such manner that counterclockwise rotation of shaft 58 will engage and drive the index wheels 47 forwardly to zero position during a single revolution of shaft 58.

Figure 2:
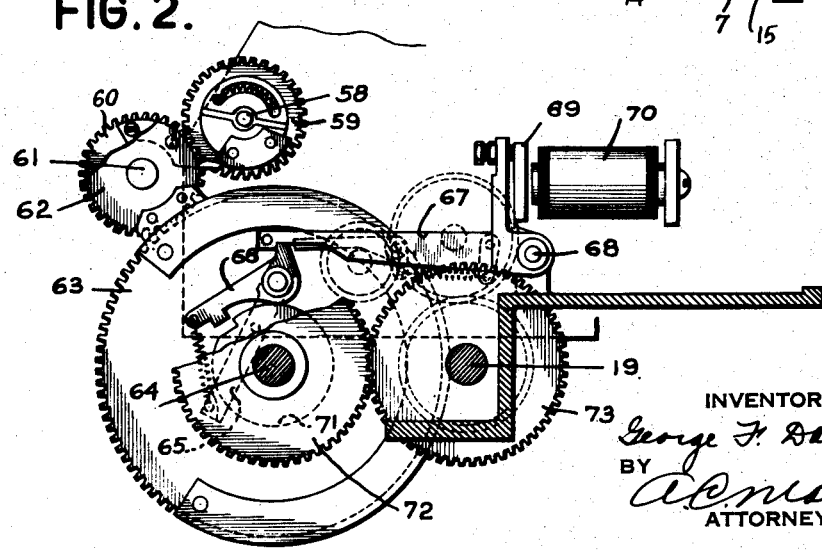
Fig. 2 is a detailed view of the controlling devices of the accumulator resetting mechanism.

Referring to Fig. 2, shaft 58 carries a gear 59 at its extremity which is in engagement with gear 60 mounted upon reset shaft 61. Gear 60, of which there is one for each accumulator, may be selectively coupled to the resetting shaft 61 in the well known manner more fully explained in the application above referred to. At the extremity of shaft 61 is a gear 62 (see also Fig. 5) which is adapted to be driven by an intermittent gear 63 which is secured to shaft 64. Also fixed to shaft 64 is an arm 65 which carries spring-pressed clutch dog 66 normally held in the position shown in Fig. 2 by a latching arm 67 supported by armature shaft 68 of magnet armature 69. Energization of magnet 70 will release dog 66 for engagement with clutch driving element 71. Element 71 is integral with a gear 72 which meshes with a gear 73 secured upon constantly running shaft 19. With this arrangement, drive element 71 is in constant rotation and whenever it is desired to effect resetting of the accumulators, magnet 70 is energized to provide a connection between the element 71 and the resetting shaft 61. Resetting is usually an accompaniment of total taking and by virtue of the intermittent gear connection occurs during the latter part of the total taking cycle. Heretofore in machines of this type, the total taking shaft 64 has been separately driven by a so-called "reset" motor and has been provided with mechanism for independently controlling the operation of the printing mechanism. With the present arrangement, total taking is brought about simply by energizing the magnet 24 to cause operation of the printing devices in the same manner as for listing and by energizing the reset clutch magnet 70 so that resetting may follow the printing of the totals from the accumulators.

Circuit controlling devices

Carried by a stud 74 coaxial with shaft 64 is a pair of electrically connected brushes 75, one of which contacts with conducting segments 76 while the other wipes over a common arcuate conducting strip 77. The brushes 75 are carried by a gear 78 driven through an idler 79 from a gear 80 carried by constantly running shaft 19 and the timing is such that a brush 75 successively contacts with each of the segments 76 as a corresponding type element 31 of Fig. 3 approaches printing position opposite platen 32.

These contact devices, generally known as emitters, control the transferring and total printing circuits in a manner to be more fully explained hereinafter.

In Fig. 5 are shown a plurality of cam controlled contacts whose operation is controlled by cams carried by shaft 64. These contacts are prefixed P to indicate that they function only during total taking and resetting operations. Similar cam controlled contact devices prefixed with the letter "L" are carried by or may be driven from the shaft 19 and these devices are in constant operation as long as the driving motor functions.

In Fig. 1 is shown a shaft 81 which is driven from the gears of the card feeding mechanism and rotates only when cards are being advanced. Controlled by suitable cams on shaft 81 are contact devices, each of which is designated by the letter "F", indicating that they are associated with the feeding mechanism and operative only when the feeding mechanism functions.

*General explanation of the circuit diagram*

The wiring diagram of the electric circuits is shown in Figs. 10 and 10a wherein the various cam controlled contact devices are diagrammatically shown and suitably labelled F, L or P, for identification as just explained. The exact timing of these contact devices is shown on the timing diagram (Fig. 7) to which reference may be made for the actual time in the cycle of operation during which they function. In Fig. 7 the darkened portions represent the period during which the cam contacts are closed. Due to the numerous interlocking relays employed in the present arrangement, it has not been advisable in all instances to show relay magnets and their associated contacts in close proximity to one another. For purposes of clarity in the wiring arrangement, the relay contact points are shown n the circuits which they control and their relay nagnets are dotted adjacent thereto. Further than this, the contacts are designated with the same reference numeral as the controlling magnet, followed by a lower case letter.

Figure 9:
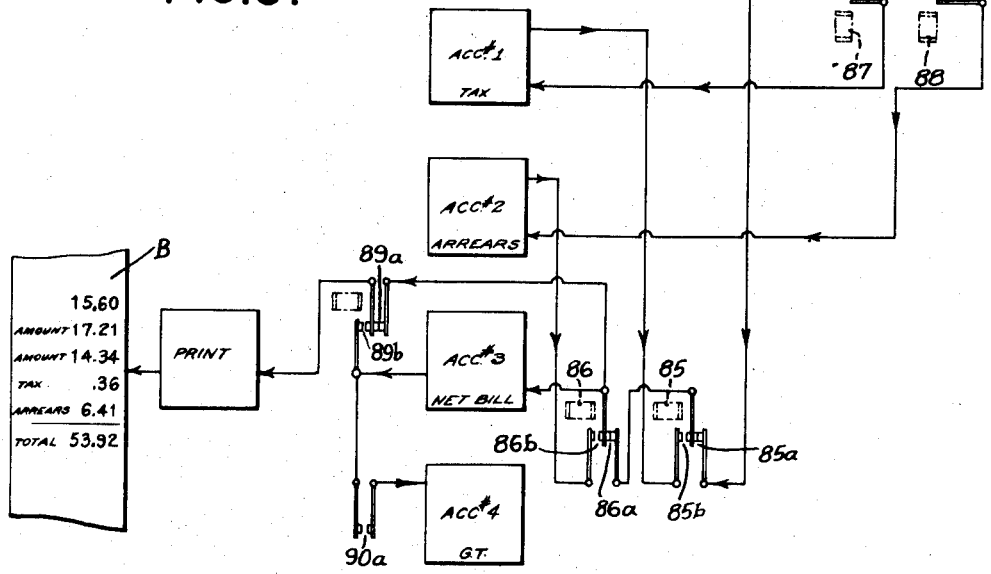
Fig. 9 is a diagrammatic view showing the arrangement of the fields of the cards and the sequence in which the various values are entered into the several machine units.

*General operation.*—The general operation of the machine will first be outlined with particular reference to Fig. 9. The record card R is provided with data fields labelled "Net bill", "Net tax", and "Arrears". The data in the first of these three fields is to be entered into ACC#3, the second field into ACC#1 and the third field into ACC#2. The "Net bill" field is normally connected for entry into ACC#3, as indicated by a line running through normally closed contacts 85a and 86a. The "Net tax" field is connected to ACC#1 through normally open contacts 87a which are closed whenever the record card contains a perforation in the X index point position of column 22. This perforation is sensed as the card passes the upper brushes and causes closure of contacts 87a during the transit of the card past the lower brushes so that the amount of the net tax may be entered into ACC#1.

In the same manner, a pair of contacts 88a associated with the "arrears" field are closed whenever a perforation in the X position of column 80 is sensed by the upper brushes so that the arrears data may be entered into ACC#2 as the card proceeds past the lower brushes. Thus, the "tax" amount will only be entered into the tax accumulator when the card contains an X22 perforation and the "arrears" amount will be entered into its accumulator only when the card contains an X80 perforation. The "Net bill" amount, however, will invariably be entered in the ACC#3. Entries will be made in this manner for each succeeding card and at the end of a group, transferring operation may take place to transfer the data in ACC#1 to ACC#3 and then from ACC#2 to ACC#3 or but one of these transfer operations may take place. During a tax transfer cycle, the amount in ACC#1 may be entered directly through contacts 85b which are closed during this cycle. This closure is effected in response to an X perforation in column 22, which, as explained above, previously selected the "tax" accumulator to receive the entry from the card. A perforation in the X position of column 79 will cause the amount in ACC#1 to be subtracted from ACC#3 by the addition of its complement. In a similar manner the amount in "arrears" accumulator #2 may be entered into ACC#3 through contacts 86b controlled by the X80 perforation and this entry may also be in complementary form for subtraction under control of an X perforation in column 21.

After all transfer operations have been completed ACC#3 may contain a summation which may be diagrammatically indicated as:

| | |
|---|---|
|  | ACC#3+2+1 |
| or | ACC#3−2+1 |
| or | ACC#3−2−1 |
| or | ACC#3+2−1 |
| or | ACC#3 alone. |

As the items in the "Net bill" field are entered into ACC#3 they are also printed on bill or statement B where three such amounts are shown and which represent the "Net bill" amounts of three successive cards. During the subsequent tax transfer cycle, the amount transferred is also introduced into the printing mechanism so that the amount of tax transferred may be recorded. Where the complement is transferred, however, the printing is suppressed but may be effected in positive form in known manner. Similarly, the positive amount transferred from ACC#3 will be printed in the same column. During the cycle in which this balance is printed, a transfer operation takes place during which the balance is also introduced into a grand total accumulator under control of contacts 98a and following this ACC#1, ACC#2 and ACC#3 are restored in preparation for the reception of data from the next group of cards. In the operation of the machine, the usual so-called "group control" mechanism is utilized to initiate a minor total taking cycle of operations which, in the present invention, includes the transfer cycles and this minor group control is responsive to perforations in the "folio" field of the record card.

As is well known, the group control device is connected to a set of upper and a set of lower sensing brushes, past which the cards are fed in succession, by plug connections to the brushes which are traversed by columns of the cards in which "control" numbers are punched. As long as the "control" holes in the card passing the lower brushes agree with the control holes in the card passing the upper brushes, card feeding continues uninterruptedly. Upon a change, feeding is stopped by the control mechanism. Comparison of any pair of control columns in two cards is predicated upon the presence of a like hole in each column. If a hole is missing in the column of one card or if both columns are blank, that is, unpunched, the group control device because of its arrangement will indicate a disagreement or group change.

Accordingly, if the control device is plug connected to brushes which traverse blank fields, there will be a disagreement indicated after each card. Another alternative is to omit the plug connections mentioned and the same result will follow. Thus, as in the present invention, where there may be a great number of so-called single-card groups and such cards alone are fed through the machine, the control plug connections, if omitted, will result in the machine automatically entering upon a total taking cycle of operations after each card.

The detailed operation of the circuit controlling devices for effecting the various operations outlined above will now be explained in more specific detail.

*Initial reset cycle.*—In the lower part of Fig. 10 is shown the usual group control mechanism, generally designated GC, and as is usual in tabulating machines, it is first necessary to set up the major and minor holding relays 91 and 92 before the machine can be started. This is effected by depression of the reset key to close contacts 93, thereby completing a circuit from right side of line 94, wire 95, contacts 93, relay contacts 85e, 86e, relay coils 98, 99 to left side of line 100. Energization of magnet 99 will close its contacts 99a in the upper part of Fig. 10 which will thereupon complete a circuit from right side of line 94, wire 95, stop key contacts ST, contacts 99a, relay magnet 101, contacts 102, main drive clutch magnets 103, to line 100. Energization of magnets 103 will cause coupling of the driving motor to the pulley shaft 6, mentioned above, and will, incidentally, cause opening of contacts 102 whereupon relay 104 will be included in the series circuit through magnet 103 and will close its contacts 104a to complete the circuit through motor TM. Contacts 101a provide a holding circuit which is traceable from the contacts through cam contacts L1 and wire 95 to line 94. Cam contacts L1, open toward the end of each cycle, and at such time, the circuit through magnet 101 is maintaind through either contacts UCLa or contacts LCLa which are in series with contacts 106b and list control contacts LCa.

The manner in which one or more of these contacts in the holding circuit may be opened to interrupt the same will be explained hereinafter. When the machine is set for automatic resetting, following total taking operations, switch 105 is closed as shown, to short-circuit contacts LCa. The relay magnet 99, energized by depression of the reset key will close a second pair of contact points 99b for completing a circuit from line 94, wire 95, cam contacts L2, contacts 99b, reset magnet 70, to line 100.

As explained in the mechanical description, energization of magnet 70 will effect resetting of the accumulators and will cause a cycle of operation of the P cam contacts of which contacts P3 (the lower part of Fig. 10) close to set up the minor control circuit and contacts P2 operate to set up the major control circuit. The detailed manner in which the group control mechanism functions to control the operation of the machine is well known in the art and fully set forth in the Patent No. 1,976,617 above referred to so that such detailed description will be unnecessary here. Suffice it to say that upon a change in the minor group classification perforations, relay magnets 92, 107, 108 will become deenergized and a change in the major group classification perforations will cause the machine to stop.

The circuit set up during the reset cycle is traceable from line 100 (Fig. 10), contacts P2, P3, relay magnets 92, 107, 108, F3, and F2 to line 94. During each card feeding cycle, contacts F2 and F3 open momentarily as indicated in Fig. 7. If the device is plug connected in the usual manner for control by the perforated fields of successive cards, there will be a shunt circuit completed to maintain the magnets energized. If the holes sensed disagree there will be no shunt circuit and the magnets will become deenergized.

It is obvious therefore that if the device is not plug connected, no possible shunt circuit can be completed and the magnets will become deenergized following the sensing of each card.

*Starting circuit.*—With the group control set up, that is, with magnets 91, 92, 107 and 108 energized, and the accumulators cleared, the machine is in readiness to feed cards and analyze the data thereon. Depression of start key and closure of contacts S will complete a circuit from line 94, wire 95, contacts S, relay magnet 109, contacts LCb, relay magnet 110, to line 100. The contact points 110a are in parallel with the contacts 99a and will in the same manner as explained above complete the circuit through the driving clutch magnet 103 and cause operation of the motor TM.

Relay magnet 110 is provided with a second pair of contacts 110b which are adapted on closure to complete a circuit to the card feed clutch control relay magnet 111. This circuit is traceable from line 100, magnet 111, contacts 110b, stop key contacts STa (operable concurrently with the contacts ST), relay contacts 98a, contacts 107b of the minor control relay magnet 107 which are now closed, contacts 85f, 86f, wire 95, to line 94. This circuit, it will be observed, can only be completed when the group control relay magnets are energized. Magnet 111 will close its points 111a to provide a holding circuit for the magnet and a second pair of points 111b wired in series with the feed clutch magnet 18 will energize the latter so that cards may commence to feed.

*Card lever circuits.*—As the cards are advanced past the upper set of analyzing brushes UB, the usual card lever contacts 112 are closed to complete a circuit from line 94, contacts 112, relay magnet 113, magnet UCL, wire 114, to line 100. Magnet UCL controls a number of contacts which are disposed in various circuits for controlling purposes. One of these contacts, for example UCLa pointed out above as being in the holding circuit of the motor drive clutch, will open to interrupt this circuit, if cards fail to feed past the upper brushes. Since the card lever contacts 112 open between the successive cards, a holding circuit is provided through contacts 113a and cam contacts L5 which serve to maintain magnet UCL energized during the interval when contacts 112 are open. In a similar manner, the lower card lever contacts 130 cause energization of relay magnet 115 and lower card lever relay LCL and the contact points 115a cooperate with cam contacts L6 to provide a similar holding circuit.

*Listing circuits.*—If the machine is to list the items contained on the cards, switch 116 is closed, as shown, and a circuit completed thereby from line 94, wire 95, contacts L2, switch 116, list cam clutch magnet 24, to line 100. Through this circuit, magnet 24 is energized each cycle of operation of the machine and the printing mechanism will function accordingly.

As the record cards advance past the lower brushes, the entries made in the "amount" fields as explained in connection with Fig. 9 are entered into the appropriate accumulators. In the "tax" and "arrears" fields, the entering circuits are only completed if the contacts 87a and 88a are closed. This closure, as explained above, is effected for the "tax" field only when there is an X22 perforation and for the "arrears" field when there is an X30 perforation. Both these X positions are analyzed by the upper brushes and if there is a hole in the X22 position, for example, a circuit will be completed from left side of line 100, cam contacts L12, common contact roller of the upper brushes, brush UB in column 22, suitable plug connection 200 to plug socket labelled X22, thence through cam contacts F6, timed to close during the analysis of the X position, relay magnet 117, contacts UCLb, wire 95, to line 94. Magnet 87 wired in parallel with relay magnet 117 will be concurrently energized and closure of contacts 117a will provide a holding circuit traceable from line 100, contacts F7, contacts 117a, magnets 117 and 87, contacts UCLb, wire 95, to line 94. In an exactly similar manner, magnet 88 may be energized under control of an X perforation in column 80 and the circuit set up to close contacts 88a will be held during the passage of the card past the lower brushes so that entries may be made into the accumulators. If either of these X perforations is missing, then, of course, the related field will not effect entries into the corresponding accumulator.

As explained in connection with Fig. 9, the listing and entering circuits for ACC#3 extend serially through normally closed contacts 85a and 86a. These contacts are shown in Fig. 10a and the entering circuit connection may be traced from contacts 85a (one blade of which is connected to the lower brush in the "Net bill" field), through a plug connection 118, to contacts 86a, thence through a plug connection 119 to the adding magnet 44 of ACC#3. A parallel connection 120 extends to contacts 88a which are normally closed and from these to a plug connection 121 to contacts 131a and thence to the printing magnet 36 associated with ACC#3. Through these circuits the amount sensed in the "Net bill" field is accumulated and printed.

Thus far we have seen how the data perforated in the three fields of the card under consideration may be separately entered into ACC#1, ACC#2 and ACC#3 and how printing will take place to record the data entered into ACC#3. This cycle of operations takes place for each of the cards of the group having the same folio number.

*Tax transfer cycle setup.*—Referring now to Fig. 10 a plug socket 122 is provided from which a plug connection is made to the lower brush LB associated with column 22 and if any of the cards of the group contains an X perforation in column 22, which as explained above, causes entry of the tax amount into ACC#1, the same perforation as it passes the lower brushes will complete circuits to prepare the machine for a transferring operation at the end of the analysis of the entire group. The initial circuit extends from right side of line 94, lower card lever contacts 130, wire 125, circuit breakers 126, cam contacts F1, lower brush common, X22 perforation, plug connection such as 123, socket 122, contacts F6, relay magnet 124, wire 114 to line 100.

This circuit is held through contacts 124a extending from line 94, through relay contacts 96d, contacts 124a, magnet 124, wire 114, to line 100.

Magnet 124 is adapted to close a second pair of contacts 124c which will set up a circuit upon completion of the analysis of the card group, as will be explained later. A third pair of contacts 124b will also be opened at this time. Thus an X22 perforation in any of the cards of the group will energize relay magnet 124 which will thereafter remain energized to control the tax amount transferring operations during later cycles.

*Arrears transfer cycle setup.*—An exactly similar set of circuits is completed to prepare the machine for transferring the arrears amount. In this case, the socket 128 is provided, which is plug connected as by a connection 201 to the lower brush LB which traverses column 80 and an X perforation in this column will, through cam contacts F5, cause energization of relay magnet 129 whose contacts 129a provide a holding circuit and whose contacts 129b prepare an arrears transfer circuit in the same manner as contacts 124c. Thus, if the tax amount is to be transferred, relay magnet 124 will be energized during the analysis of the card or group of cards and its several pairs of contacts will be operated, and if the arrears amount is to be transferred, the relay magnet 129 will have been similarly energized and its related pairs of contacts also shifted.

Cycles of operation

*Initiation of transferring operations.*—In the following it will be assumed that the machine is to perform successive tax and arrears transferring operations upon the completion of the analysis of a group of cards and the various steps involved in these operations are now to be explained.

After the last card of the group has been analyzed and its data properly entered, the group control mechanism GC, in the well known manner, will cause deenergization of relay magnets 92, 107 and 108 shown in the lower part of Fig. 10. Magnet 107 will open its relay contacts 107b in the feed magnet controlling relay circuit to deenergize relay magnet 111 which in turn will open its contact points 111b to deenergize the feed magnets 18 so that further card feeding operations will be interrupted. Deenergization of magnet 108 under control of the automatic control devices will cause closure of contacts 108a and a circuit will be completed therethrough upon closure of cam contacts L13 during the latter part of the last card cycle which is traceable from line 94, contacts L13, contacts 108a, contacts 124c (now closed due to the fact that magnet 124 is now energized), magnet 85, wire 114 to line 100.

*Tax transfer cycle.*—The machine is now prepared to transfer the tax amount from ACC#1 to ACC#3. Referring now to Fig. 10a, the amount standing in ACC#1 will be represented by the location of the various brush structures 50 which bridge the individual segments 51 and common strips 52. The emitter shown in the lower portion of the figure will have its common strip 77 connected to right side of line 94 through closed switch 134 and impulses will be successively impressed upon the segments 76 through the brushes 75 in the order 9, 8, 7, etc., to transmit these impulses to all of the nine segments 51, all of the eight segments 51, and so on, in succession. Wherever a segment is connected by a brush 50 to its related strip 52 the circuit will be completed as follows:

Assuming that the brush 50 in the highest denominational order of ACC#1 is set (as indicated in dotted outline) to bridge the "5" segment 51 and the strip 52. At the "5" time in the cycle, therefore, a circuit will be completed from line 94, switch 134, which is closed as shown, common strip 77, brushes 75, "5" segment 76 to all of the "5" segments 51, brush 50 in the highest order of ACC#1, strip 52, wire 132, contacts 85b, now closed, plug connection 118, contacts 86a, now closed, plug connection 119 to adding magnet 44 of ACC#3. At the same time the parallel circuit through plug connection 120, contacts 89a, and contacts 131a will energize the corresponding printing magnet 36 to print the amount transferred. In this manner the amount standing in ACC#1 will be transferred to ACC#3 during a single cycle of the machine and the amount will also be printed.

Upon the initial energization of magnet 85 a pair of associated contacts 85c will be closed setting up a holding circuit for the magnet traceable from line 94 (Fig. 10), contacts P5, L11 and 85c, magnet 85, wire 114, to line 100. The accompanying closure of a further pair of contacts 85d will also permit completion of a circuit, when cam contacts L14 close, which is traceable from line 94, contacts L14, 85d, magnet 96, wire 114 to line 100. Contacts 96e (closed by magnet 96) will provide a holding circuit for the latter which runs through cam contacts P5 so that the magnet 96 will remain energized until total printing operations have been performed. A pair of contacts 96d will be opened upon energization of magnet 96 thereby interrupting the holding circuit through the tax pickup relay magnet 124 which in turn will now permit opening of its contacts 124c and closure of its contacts 124b.

A pair of contacts 85g is provided in parallel with the lower card lever contacts 130 which are now open since card feeding operations have been interrupted. The function of contacts 85g therefore is to maintain the lower card lever relay magnet LCL energized which in turn keeps the driving motor in operation.

Contacts 85e are open during this cycle to prevent the manual initiation of resetting operations and a further pair of contacts 85h is also open to prevent the automatic restarting of card feeding operations which operation will be explained in detail hereinafter.

*Arrears transfer cycle.*—Near the end of the tax transfer cycle, cam contacts L13 will again close, this time completing a circuit from line 94, contacts L13, contacts 168a (still closed), contacts 124b and 129b, both now closed, magnet 86, wire 114 to line 100. Magnet 86 will close its contacts 86c to provide a holding circuit for itself through contacts L11 and P5, and a pair of points 86d closed thereby will cause energization of magnet 97 which in turn will close contacts 97e to provide a holding circuit through contacts P5. Contacts 97d controlled by magnet 97, will open the holding circuit of the arrears pickup relay magnet 129 so that its contact prints may return to normal. Magnet 86 in the same manner as explained in connection with magnet 85 is provided with a pair of contacts 86g for short circuiting lower card lever contacts 130 to keep the driving motor in operation, and with contacts 86e and 86h in the manual reset and automatic start circuits, respectively.

Referring now to Fig. 10a, the magnet 86 will open the contacts 86a and close contacts 86b and during this cycle, transferring will take place from the read-out devices of ACC#2 to the adding and printing magnets associated with ACC#3. The transferring circuit is traceable from the read-out strip 52 of ACC#2 to wire 133, contacts 86b, plug connection 119, adding magnet 44 of ACC#3 to line 100 and from contacts 86b through plug connection 120, contacts 89a, connection 121, contacts 131a, printing magnet 36, to line 100. In this manner, the amount standing on ACC#2 will be entered into the adding mechanism of ACC#3 and printed by the associated printing devices. After transferring has been effected, cam contacts L11 (Fig. 10) will open so that magnet 86 will be deenergized and its various contacts will return to the positions shown in the circuit.

*Total printing and reset cycle*

With both magnets 85 and 86 deenergized following the transfer cycles their associated contacts 85f and 86f will be closed so that, since minor control relay magnet contacts 107a are still closed at this time, a circuit will be completed from line 94, wire 95, contacts 86f, 85f, 107a, L8, relay magnet 135, magnet LC, to line 100. Magnet 135 will close its contacts 135a in the reset magnet circuit and the magnet 70 will therefore become energized and through the mechanism controlled thereby the shaft carrying the cams for controlling the P contacts will function. The first operation to take place will be total printing from ACC#3 and the concurrent transferring of this total into the adding magnets of ACC#4. For this purpose, it is necessary to energize magnets 89 and 90 (Fig. 10a) so that their associated contacts 89b and 90a may be closed to establish the total printing circuit from the read-out strip 52 of ACC#3 through contacts 89b, plug connection 121, contacts 131a, print magnet 36 to line 100.

A parallel circuit extends from read-out strip 52 of ACC#3 through wire 136, contacts 90a, plug connection 137, adding magnet 44 of ACC#4 to line 100. In this manner the entry in ACC#3 may be both printed and transferred during the same cycle. Magnets 89 and 90 are connected in series and the controlling circuits therefor are shown in the upper part of Fig. 10a. As explained above, magnet LC is energized at this time and its contacts LCc are closed to permit the completion of a circuit from line 100, cam contacts L9, switch 137, contacts LCc, magnets 90, 89 to line 94. Later in the reset cycle, the resetting instrumentalities will come into play to zeroize the several accumulators in the manner explained above. In connection with ACC#4, however, the resetting mechanism is ineffective and the amounts in ACC#4 will continue to accumulate to obtain a grand total of all the entries transferred from ACC#3.

*Automatic resumption of card feeding*

Cam contacts L3 (Fig. 10) are provided to energize the start relay magnet 110 near the end of the resetting cycle of operations at which time the several series connected relay contacts 86h, 85h, 106a, LCb will be closed and the circuit therefore will be completed through magnet 110 which will cause energization of the relay 111 as explained to energize the card feed clutch magnet 18. The circuits involved in the starting of the machine have already been traced in detail and the operations controlled thereby will proceed in the same manner as explained above.

*Stop circuits.*—If it is desired to have the machine stop after the completion of the resetting operation, switch 138 (Fig. 10) is closed and near the end of the resetting cycle cam contacts P1 close momentarily to complete a circuit from line 94, wire 95, switch 138, contact P1, relay magnets 138 and 106 to line 100. The holding circuit through contacts 139a and cam contact L4 will keep the magnets energized. Contacts 106a of magnet 106 are in the automatic restarting circuit and when open prevent the reenergization of start relay 110. The machine will therefore come to rest at the completion of the resetting cycle of operations and resumption of operations may then proceed through initiation of the start key to close contacts S.

*Single transfer cycle*

Where one of the cards of the group contains an X22 perforation but none contains an X80 perforation, only the tax transfer relay circuits controlled by relay magnet 124 will be energized so that upon the operation of the group control mechanism the machine will proceed through the tax transfer cycle of operations as described above. At the completion of this transfer cycle, since arrears pickup magnet 129 is not energized during the analysis of the group, its contacts 129b will be open, the arrears transfer magnet 86 will not be energized and consequently both contacts 85f and 86f will be closed at the end of the tax transfer cycle so that the total taking and resetting cycle will be initiated at this time as explained.

If a card of the group contained an X80 perforation but no X22 perforation, then only the arrears pickup relay magnet 129 would be energized and not the tax pickup relay magnet 124 so that upon the initiation of transferring operations, magnet 86 would be energized instead of magnet 85 due to the fact that contacts 124c are opened and 124b and 129b closed.

At the completion of the transfer cycle during which the arrears amount or total in ACC#2 is transferred to ACC#3 magnet 86 will become deenergized and again contacts 85f and 86f are closed at the end of the cycle so that the total taking and resetting cycles will immediately follow.

Where none of the cards of the group contain either the X22 or X80 perforation indicating that no transferring operations are to take place for that group, contacts 85f and 86f will both be closed at the end of the last card reading cycle so that closure of contacts L8 near the end of that cycle will initiate the total taking and resetting operations without intervening transferring cycles.

*Subtracting selection circuits*

Under certain conditions it is desirable to transfer the tax or the arrears or both the amounts subtractively to ACC#3. This is effected by entering into the accumulator the complementary value of the amount standing on the tax or arrears accumulator. If the transfer is to be of the complement of the tax amount, one of the cards of the group is provided with an X perforation in column 79 and if the complement of the arrears is to be transferred, a perforation is provided in the X position of column 21 so that as the cards pass the lower brushes may be completed (see Fig. 10a) from the appropriate lower brushes to plug sockets X21 and X79 through plug connections 202 and 203, respectively, and through contacts F10 and F11 to energize corresponding relay magnets 140, 141 whose contacts 140a and 141a provide holding circuits extending from the left side of line 100, through magnets 140 or 141, corresponding contacts 140a, 141a, wire 142 (see also Fig. 10), through cam contact P5 to right side of line 94. The magnets 140 and 141 will accordingly be energized in response to an X79 or an X21 perforation, respectively, and will remain energized until total printing operations have taken place.

Magnets 140 and 141 have each a second pair of contacts 140b and 141b wired in parallel as shown and connected to pairs of contacts 85j and 86j. Contacts 140b are in series with the tax transfer contacts 85j and contacts 141b are connected to the arrears contact 86j. The relationship is such that if a card of the group contains an X22 perforation indicating that the tax transfer cycle is to take place, contacts 85j will be closed in the manner explained above and if an X79 perforation is also sensed, contacts 140b will also be closed so that a circuit is completed from line 94, contacts 140b, 85j and thence through magnets 143 and 131 to line 100. In the same manner, if one of the cards of the group has an X80 perforation and the same or another card of the group has an X21 perforation, the circuit to magnets 143 and 131 will be completed through closed contacts 141b and 86j. With this set up relay magnets 143 and 131 will be energized during cycles in which the tax amount is to be subtractively transferred and also during cycles in which the arrears amount is to be subtractively transferred and deenergized at all other times. Magnet 131 controls pairs of contacts 131a to open them and prevent printing operations during cycles in which transferring takes place subtractively since the amount transferred is a complement and it is usually not desirable to print complementary figures. The magnet 143 causes shifting of pairs of contacts 143a and 143b which are wired as shown to cause reversal of the impulse connections between ACC#2 and ACC#3. With the switching arrangement, the "9" impulse from the emitter 76, 77 will flow through the zero segments 51 of ACC#1 and ACC#2, the "8" impulses will flow through the "1" segments, the "7" impulses through the "2" segments, and so on, the segments receiving impulses corresponding to their nines complementary value and in this manner the amounts standing on either ACC#1 or ACC#2 may be converted into the nines complement and as such entered into ACC#3.

Magnet 143 is provided with an additional pair of contacts 143c shown in the upper part of Fig. 10a, which permits the completion of a circuit upon closure of cam contacts L10 to energize the carry lever magnet 53 of ACC#3. As explained above, the energization of this magnet will enter a "1" into the units order of ACC#3 and this "1" is entered whenever a complement is transferred into the accumulator, thus serving to change the nine complement to a true tens complement.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a tabulating apparatus, a plurality of record card controlled accumulators, record sensing means for sensing record cards arranged in groups, group control mechanism responsive to said sensing means to detect a change in record card groups, means for effecting the transfer of an amount standing on one of said accumulators or the complement of said amount, to another accumulator, means controlled by said group control mechanism for initiating the operation of said transferring means, and means controlled by a part of said sensing means for preselecting whether the amount or its complement is to be transferred and controlling the transfer effecting means accordingly.

2. In a tabulating apparatus, a plurality of record card controlled accumulators, record sensing means for sensing record cards arranged in groups, group control mechanism responsive to said sensing means to detect a change in record card groups, means for effecting the transfer in succession of the amounts or the complements of the amounts standing in more than one of said accumulators to another of said accumulators, means controlled by said group control mechanism for initiating the operation of said transferring means, and means controlled by a part of said sensing means for preselecting for each amount transferred whether the amount or its complement is to be transferred and controlling the transfer effecting means accordingly.

3. In a tabulating apparatus, a plurality of record card controlled accumulators, record sensing means for sensing record cards arranged in groups, group control mechanism responsive to said sensing means to detect a change in record card groups, means for effecting the adding or subtracting of the amount standing on one of said accumulators to or from the amount standing on another accumulator, means controlled by the group control mechanism for initiating the operation of said effecting means, and means controlled by a part of said sensing means for preselecting whether the amount is to be added or subtracted and controlling the transfer effecting means accordingly.

4. In a tabulating apparatus, a plurality of record card controlled accumulators, record sensing means for sensing record cards arranged in groups, group control mechanism responsive to said sensing means, means for effecting one or a plurality of successive cycles of transfer operations wherein amounts are transferred from certain of said accumulators to another of said accumulators, means controlled by said group control mechanism for initiating the operation of said effecting means, and means controlled by a part of said sensing means for preselecting the number of transfer cycles to be performed and controlling the transfer cycle effecting means accordingly.

5. In a machine of the class described, means for concurrently analyzing a plurality of fields of a single record card for designations representing amounts, an accumulator, entering means therefor, control means for controlling the operation of said entering means to successively enter, additively or subtractively, said amounts and including devices controlled by said analyzing means, a second analyzing means responsive to special designations on the card, means controlled thereby for determining whether the amounts in all or less than all of said fields are to be entered in said accumulator, means controlled thereby for controlling said control means accordingly, a third analyzing means, and means controlled by said third analyzing means for causing said control means to cause the amount from a certain one of said selected fields to be entered subtractively.

6. In a tabulating machine, in combination, record sensing means, a plurality of accumulators, entering means controlled by part of said sensing means for entering amounts in said accumulators under control of a perforated record, means for transferring to one of said accumulators the amounts in each of the other of said accumulators, means controlled by another part of said sensing means in response to the sensing of said record for selecting the accumulator or accumulators from which an amount or amounts are to be transferred to said one accumulator and means controlled by said last named means for controlling the operation of said transferring means accordingly.

7. In a cyclically operable tabulating machine with cyclically operating card feeding mechanism, a plurality of accumulators, record controlled means for effecting entries therein, means for effecting the transfer to one of said accumulators of the amount or amounts in one other accumulator or more than one other accumulator in succession, means for automatically initiating the operation of said effecting means after each card feeding cycle, record controlled means for determining the accumulator or accumulators from which transfer is to be effected and means controlled by said determining means for rendering said transfer effecting means effective for a corresponding number of operations.

GEORGE F. DALY.